United States Patent
Rymarquis et al.

(10) Patent No.: US 12,553,057 B2
(45) Date of Patent: Feb. 17, 2026

(54) METHODS FOR SELECTING INHERITABLE EDITS

(71) Applicant: MONSANTO TECHNOLOGY LLC, St. Louis, MO (US)

(72) Inventors: Linda Rymarquis, High Ridge, MO (US); Yuanji Zhang, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 451 days.

(21) Appl. No.: 17/801,738

(22) PCT Filed: Feb. 26, 2021

(86) PCT No.: PCT/US2021/019787
§ 371 (c)(1),
(2) Date: Aug. 23, 2022

(87) PCT Pub. No.: WO2021/173909
PCT Pub. Date: Sep. 2, 2021

(65) Prior Publication Data
US 2023/0083583 A1 Mar. 16, 2023

Related U.S. Application Data

(60) Provisional application No. 62/982,523, filed on Feb. 27, 2020.

(51) Int. Cl.
*C12N 15/82* (2006.01)
*A01H 1/04* (2006.01)
*C12Q 1/6806* (2018.01)
*C12Q 1/6895* (2018.01)

(52) U.S. Cl.
CPC .......... *C12N 15/8213* (2013.01); *A01H 1/04* (2013.01); *C12Q 1/6806* (2013.01); *C12Q 1/6895* (2013.01); *C12Q 2600/13* (2013.01)

(58) Field of Classification Search
None
See application file for complete search history.

(56) References Cited

U.S. PATENT DOCUMENTS

| | | |
|---|---|---|
| 2005/0053975 A1 | 3/2005 | Reddy et al. |
| 2005/0112590 A1* | 5/2005 | Boom ................ G16B 20/20 435/7.1 |
| 2007/0141614 A1 | 6/2007 | Singh et al. |
| 2018/0305756 A1 | 10/2018 | Ochoa et al. |

FOREIGN PATENT DOCUMENTS

| | | | |
|---|---|---|---|
| CN | 108866225 | 11/2018 | |
| CN | 112203505 | 1/2021 | |
| EP | 1798294 A2 * | 6/2007 | ............. C12Q 1/683 |
| EP | 2341151 | 7/2011 | |
| WO | WO2005/024068 | 3/2005 | |
| WO | WO2005/059692 A2 | 6/2005 | |
| WO | WO-2018165249 A1 * | 9/2018 | ............. C12N 15/82 |

OTHER PUBLICATIONS

Wieghaus, Annika, Dirk Prüfer, and Christian Schulze Gronover. "Loss of function mutation of the Rapid Alkalinization Factor (RALF1)-like peptide in the dandelion Taraxacum koksaghyz entails a high-biomass taproot phenotype." PLoS One 14.5 (2019): e0217454. (Year: 2019).*
CN 202180017067.4: Office Action dated Feb. 7, 2024. CN202180017067.4 has the same priority claim as the instant application.
Changtian Pan et al: "CRISPR/Cas9-mediated efficient and heritable targeted mutagenesis in tomato plants in the first and later generations", Scientific Reports, Apr. 21, 2016, 10 pages.
Nathaniel M. Butler et al: Generation and Inheritance of Targeted Mutations in Potato (*Solanum tuberosum* L.) Using the CRISPR/Cas System, PLOS One, Dec. 14, 2015, 12 pages.
Hyun Youbong et al: "Site-directed mutagenesis in*Arabidopsis thaliana*using dividing tissue-targeted RGEN of the CRISPR/Cas system to generate heritable null alleles", Planta, Springer Berlin Heidelberg, Berlin/Heidelberg, Oct. 1, 2014, pp. 271-284.
De Filippis Francesca et al: "Different Amplicon Targets for Sequencing-Based Studies of Fungal Diversity", Applied and Environmental Microbiology, Sep. 1, 2017, 9 pages.
Mao Yanfei et al: "Heritability of Targeted Gene Modifications Induced by Plant-Optimized CRISPR Systems", CMLS Celular and Molecular Life Sciences, Birkhauser Verlag, Heidelberg, DE, Sep. 27, 2016, 19 pages.
Bertier Lien D et al: "High-Resolution Analysis of the Efficiency, Heritability, and Editing Outcomes of CRISPR/Cas9-Induced Modifications of NCED4 in Lettuce (*Lactuca sativa*)", G3: Genes, Genomes, Genetics, May 1, 2018, 9 pages.

* cited by examiner

*Primary Examiner* — Amjad Abraham
*Assistant Examiner* — Kelsey L Mcwilliams
(74) *Attorney, Agent, or Firm* — Harness, Dickey & Pierce, P.L.C.

(57) ABSTRACT

The reported method identifies the likelihood that a heritable sequence in a plant is to be passed onto subsequent generations. One or more genome edits are introduced into a plant cell and the gnomic DNA of the resulting plant is analyzed to determine the frequency of the one or more genome edits in the sample. Edits that are present in a quantity above a reference cutoff are considered to have a high likelihood of being heritable and capable of being passed on to subsequent generations. Edits that are present in low quantities are considered to have a low likelihood of being passed on. Plants containing desirable genome edits that are likely to be heritable are then used for cultivation and propagation.

4 Claims, 9 Drawing Sheets

| Sample ID | Ref | Target | Edit_call | Abundance | Percent | Match_str |
|---|---|---|---|---|---|---|
| sample1 | gene1 | target1 | S2d9<br>S4d8<br>u0 | 7048<br>6636<br>4918 | 37.39<br>35.21<br>26.09 | |
| sample2 | gene1 | target1 | u0 | 16664 | 93.34 | |
| sample3 | gene1 | target1 | u0<br>S-1d11 | 12944<br>7510 | 62.57<br>36.3 | |
| sample4 | gene1 | target1 | u0 | 14442 | 92.14 | |
| sample5 | gene1 | target1 | u0<br>S-37d48 | 8884<br>6386 | 57.73<br>41.5 | |
| sample6 | gene1 | target1 | u0 | 24684 | 98.41 | |

FIG. 8

| Sample | Ref | Zygosity target 1 |
|---|---|---|
| Sample1 | gene1 | chimeric wt, -9, -8 |
| Sample2 | gene1 | wt |
| Sample3 | gene1 | Biallelic wt, -9 |
| Sample4 | gene1 | wt |
| Sample5 | gene1 | Biallelic wt, -48 |
| Sample6 | gene1 | wt |

FIG. 9

METHODS FOR SELECTING INHERITABLE EDITS

CROSS-REFERENCE TO RELATED APPLICATIONS

This application is a U.S. National Stage of International Application No. PCT/US2021/019787, filed on Feb. 26, 2021, which claims the benefit of and priority to, U.S. Provisional Application No. 62/982,523, filed on Feb. 27, 2020. The entire disclosure of each of the above applications is incorporated herein by reference.

FIELD

The present disclosure generally relates to methods for selecting inheritable edits, for example, in plants, etc., and more particularly, to methods for predicting the heritability of edits in order to select those edits that can be passed to subsequent generations.

BACKGROUND

This section provides background information related to the present disclosure which is not necessarily prior art.

Genome editing tools can be used to introduce desirable nucleotide changes ("edits") in the genome of plant cells. Once an edit is made, all cells arising from the edited cell through mitosis will also carry the edit. Edits are passed to subsequent generations (is "heritable" or "recoverable") only when the cell containing the edit is a germline cell. For example, an edit occurring in an isolated leaf cell late in the plant's life will not be inherited, whereas an edit occurring early in the meristematic tissue is more likely to be perpetuated throughout the plant, including the germ cells. Thus, location and timing of the edit influences the likelihood of heritability.

Genome editing has the potential to improve agriculture by providing plants with desirable agronomic characteristics, like disease resistance, resistance to drought, and improved yield. In order to realize these benefits, genome edits must be heritable. Propagation of genome edited plants is resource intensive, taking up limited greenhouse space. These valuable resources are wasted when taking plants with non-heritable somatic edits through to the next generation. It is therefore desirable to select only those plants with a high likelihood of having heritable edits for further propagation.

SUMMARY

This section provides a general summary of the disclosure and is not a comprehensive disclosure of its full scope or all of its features.

Example embodiments of the present disclosure generally relate to methods of identifying the likelihood of a heritable sequence in a plant. Example embodiments also generally relate to methods for selecting a plant with heritable edits.

With that said, in one example embodiment, a method for identifying the likelihood of a heritable sequence in a plant includes obtaining cells from a plant; extracting and isolating DNA from said plant; amplifying target sequences from the DNA; identifying and quantifying insertions and/or deletions within the amplified target sequence; and predicting the heritability of a sequence based on the quantity of the insertions and/or deletions in the amplified target sequence, wherein the amplified target sequence is determined to have a high likelihood of heritability when the quantity of the amplified target sequence is at or above a reference cutoff, and wherein when the amplified target sequence is determined to have a low likelihood of heritability when the quantity of the target sequence is above a noise cutoff but below the reference cutoff.

In another example embodiment, a method for selection of a plant with heritable edits includes obtaining cells from a plant; extracting and isolating DNA from said plant; amplifying a target sequence from the DNA; quantifying the number of reads for a specific edited allele relative to all reads obtained from the target sequence; selecting at plant wherein the specific edited allele is at least about: 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99% of total reads from the target sequence.

Several embodiments relate to a method for identifying the likelihood of a heritable sequence in a plant, the method comprising: contacting the plant with a sequence-specific editing enzyme; obtaining cells from the edited plant; extracting and isolating DNA from the plant; amplifying target sequences from the DNA; identifying and quantifying sequences comprising modifications within the pool of amplified target sequences; and predicting the heritability of a modified sequence based on the abundance of the modified sequence within the pool of amplified target sequences; wherein the modified sequence is determined to have a high likelihood of heritability when the abundance of the modified sequence is at or above a 10% reference cutoff; herein the modified sequence is determined to have a low likelihood of heritability when the abundance of the modified sequence is below a 10% reference cutoff. In some embodiments, the cells are obtained from two or more parts of the plant. In some embodiments, the part of the plant from which the cells are obtained is selected from the group consisting of the leaf, stem, root, meristem, and germline. In some embodiments, the plant is a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant. In some embodiments, the method utilizes fragment length analysis. In some embodiments, the method utilizes Sanger sequencing, Shotgun sequencing, Fragment Length Analysis (FLA), Single-molecule real-time sequencing (PacBio), Ion Torrent sequencing, Pyrosequencing, Sequencing by synthesis (Illumina), Combinatorial probe anchor synthesis, Sequencing by ligation (SOLiD sequencing), Nanopore Sequencing, or GenapSys Sequencing. In some embodiments, the abundance of the modified sequence is about four times above the noise cutoff. In some embodiments, the reference cutoff is selected from about 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99%. In some embodiments, a plant with a sequence having a high likelihood of heritability is selected and propagated. In some embodiments, the method utilizes amplicon sequencing. In some embodiments, the method utilizes short amplicon sequencing (SASi) or long amplicon sequencing (LASi).

Several embodiments relate to a method for identifying the likelihood of a heritable sequence in a plant, the method comprising: contacting the plant with a sequence-specific editing enzyme; obtaining cells from the edited plant; extracting and isolating DNA from the plant; amplifying target sequences from the DNA; identifying and quantifying sequences comprising modifications within the pool of amplified target sequences; and predicting the heritability of a modified sequence based on the abundance of the modified sequence within the pool of amplified target sequences; wherein the modified sequence is determined to have a low likelihood of heritability when the abundance of the modified sequence is above a noise cutoff but below the fold cutoff. In some embodiments, the cells are obtained from two or more parts of the plant. In some embodiments, the part of the plant from which the cells are obtained is selected from the group consisting of the leaf, stem, root, meristem, and germline. In some embodiments, the plant is a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant. In some embodiments, the method utilizes fragment length analysis. In some embodiments, the abundance of the modified sequence is about four times above the noise cutoff. In some embodiments, the reference cutoff is selected from about 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99%. In some embodiments, a plant comprising a heritable sequence is selected and propagated. In some embodiments, the method utilizes amplicon sequencing. In some embodiments, the method utilizes short amplicon sequencing (SASi) or long amplicon sequencing (LASi).

Several embodiments relate to a method for selection of R0 plants with heritable edited alleles, the method comprising: obtaining cells from each R0 plant; extracting and isolating DNA from said each R0 plant; generating amplicons comprising a target site from the DNA; determining the relative abundance of a selected edited allele; selecting R0 plants wherein the relative abundance of the selected edited allele is at least about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50%. In some embodiments the selected R0 plants are propagated. In some embodiments the selected R0 plants are crossed. In some embodiments the selected R0 plants are selfed. In some embodiments, the R0 plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant. In some embodiments, the R0 plants are analyzed using fragment length analysis. In some embodiments, the R0 plants are analyzed using amplicon sequencing. In some embodiments, the R0 plants are analyzed using short amplicon sequencing (SASi) or long amplicon sequencing (LASi).

Several embodiments relate to a method for selection of R0 plants with heritable edited alleles, the method comprising: obtaining cells from each R0 plant; extracting and isolating DNA from said each R0 plant; generating amplicons comprising a target site from the DNA; determining the noise cutoff for an FLA assay of the R0 plant amplicons; selecting R0 plants comprising edited alleles corresponding to peaks that are at least four times the noise cutoff. In some embodiments the selected R0 plants are propagated. In some embodiments the selected R0 plants are crossed. In some embodiments the selected R0 plants are selfed. In some embodiments, the R0 plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant.

Several embodiments relate to a method for selection of R0 plants with heritable edited alleles, the method comprising: obtaining cells from each R0 plant; extracting and isolating DNA from said each R0 plant; generating amplicons comprising a target site from the DNA; determining the fold cutoff for an FLA assay of the R0 plant amplicons; determining the noise cutoff for an FLA assay of the R0 plant amplicons; selecting R0 plants comprising edited alleles corresponding to peaks that less than or equal to the fold cutoff and greater than the noise cutoff. In some embodiments the selected R0 plants are propagated. In some embodiments the selected R0 plants are crossed. In some embodiments the selected R0 plants are selfed. In some embodiments, the R0 plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant. In some embodiments, the R0 plant is diploid. In some embodiments, the R0 plant is polyploid. In some embodiments, the R0 plant is tetraploid.

Several embodiments relate to a method for selection of R0 plants with heritable edited alleles, the method comprising: obtaining cells from each R0 plant; extracting and isolating DNA from said each R0 plant; generating amplicons comprising a target site from the DNA; determining the FLA peak ratios of the R0 plant amplicons; selecting R0 plants comprising edited alleles corresponding to peaks that less than or equal to 1, 1.25, 2.5, or 5. In some embodiments the selected R0 plants are propagated. In some embodiments the selected R0 plants are crossed. In some embodiments the selected R0 plants are selfed. In some embodiments, the R0 plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant. In some embodiments, the R0 plant is diploid. In some embodiments, the R0 plant is polyploid. In some embodiments, the R0 plant is tetraploid.

Several embodiments relate to a method for determining the zygosity of R0 plants, the method comprising: obtaining cells from each R0 plant; extracting and isolating DNA from said each R0 plant; generating amplicons comprising a target site from the DNA; determining the FLA peak ratios of the alleles at the target site; and selecting those alleles wherein the FLA peak ratio of such allele is at least about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50%.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIG. 1 is a graphical representation of a signal to noise determination and the fold cutoffs for a Fragment Length Analysis (FLA) assay. The noise cutoff is denoted by the black arrowhead and is set at twice the height where greater than 50% of plants assayed have one presumptive noise peak. The fold cutoff is denoted by a white arrowhead. The fold cutoff is calculated by 1.25*allele number amplified by assay. Peaks with a FLA Peak ratio less than or equal to the fold cutoff and greater than the noise cutoff were determined to be edits having a high likelihood of heritability (1A). Peaks with a FLA Peak ratio greater than the fold cutoff, but greater than the noise cutoff, were considered edits with a low likelihood of heritability (1B). Peaks that are common to greater than or equal to (>=) 80% of plants and are not of the expected wild type (WT) size (indicated by an "*") are likely PCR artifacts or amplification of gene family members and are removed prior to noise cutoff and max height calculations (1C).

Figure 5:
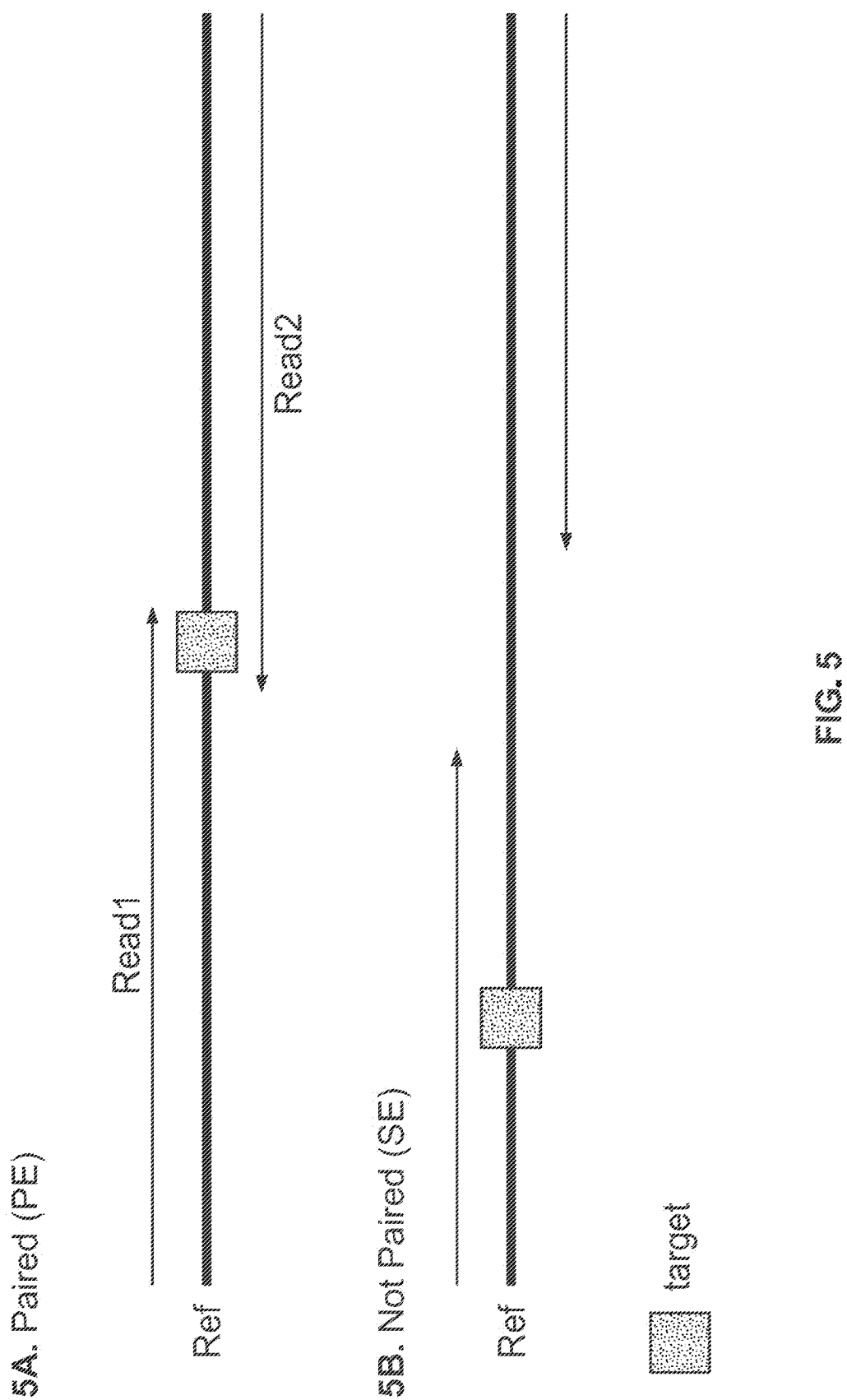

FIG. 5 schematically illustrates reads as mapped to the reference sequence (Ref) from paired (5A) and not paired (5B) short amplicon sequencing by Illumina (SASi) sequencing protocols. The guide RNA target site is indicated by the box.

Figure 6:
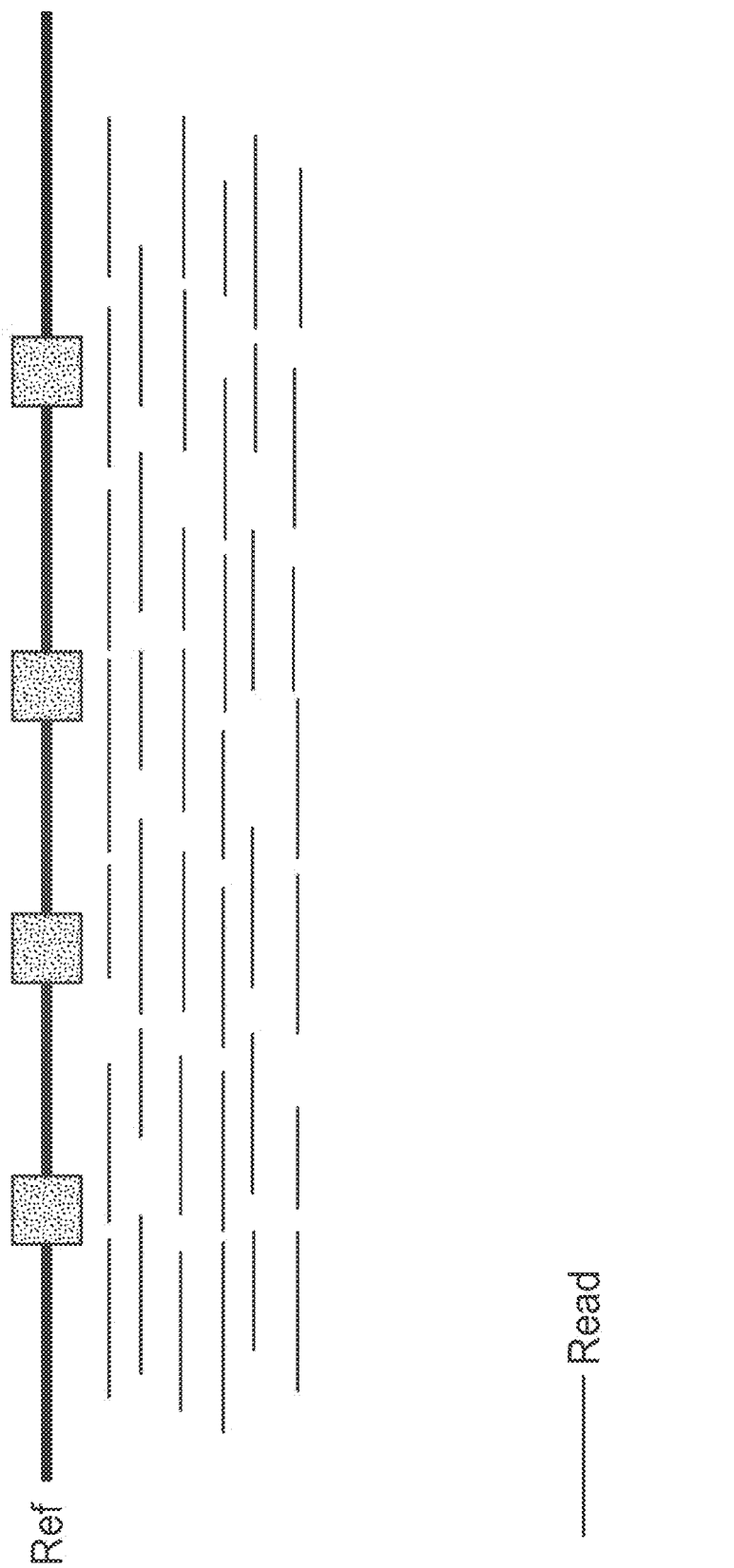

FIG. 6 schematically illustrates sequencing reads as mapped to a reference sequence from a long amplicon sequencing by Illumina (LASi) sequencing protocol. Guide RNA target sites are indicated by boxes.

Figure 7:
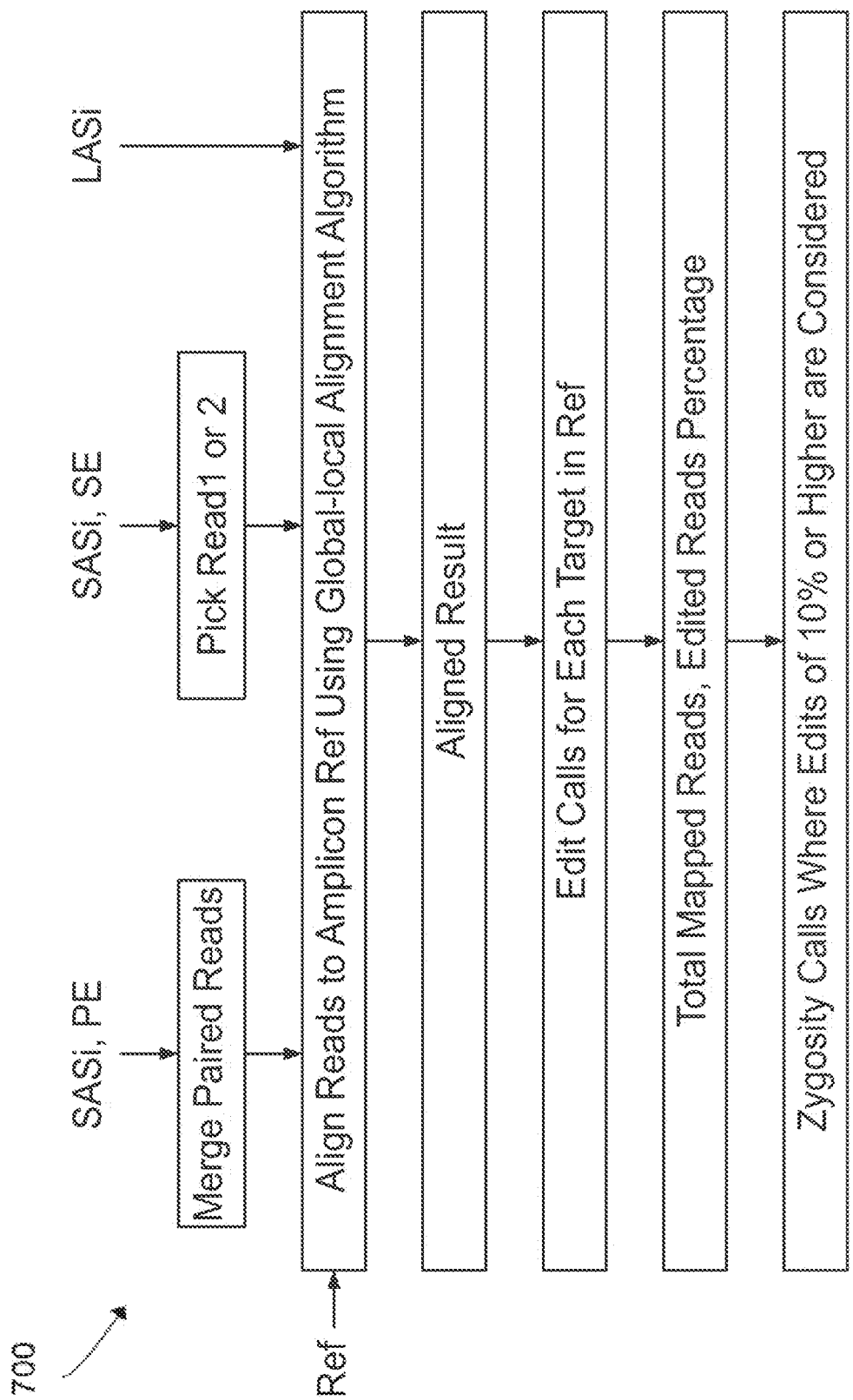

FIG. 7 illustrates an example method of selecting plants with heritable edits for further propagation and breeding.

FIG. 8 illustrates examples of edit call outputs for individual edited plants (Samples). Each ":" indicates a nucleotide identical to the Reference Sequence (WT) nucleotide, and each "−" indicates a deletion; "u0" is an observed WT, "S" indicates the relative position of the edit relative to the first base of the gRNA target site in the 5'-3' orientation, "d" is deletion. Plants corresponding to Samples 1, 3, and 5 are selected for further propagation and breeding according to the method described in FIG. 7.

FIG. 9 illustrates examples of call results showing zygosity of the plants described in FIG. 8.

DETAILED DESCRIPTION

The present disclosure now will be described hereinafter with reference to the accompanying drawings and examples, in which embodiments of the present disclosure are shown. This description is not intended to be a detailed catalog of all the different ways in which the present disclosure may be implemented, or all the features that may be added to the instant disclosure. For example, features illustrated with respect to one embodiment may be incorporated into other embodiments, and features illustrated with respect to a particular embodiment may be deleted from that embodiment. Thus, the present disclosure contemplates that in some embodiments of the present disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. Hence, the following descriptions are intended to illustrate some particular embodiments of the present disclosure, and not to exhaustively specify all permutations, combinations and variations thereof.

Unless otherwise defined, all technical and scientific terms used herein have the same meaning as commonly understood by one of ordinary skill in the art to which the present disclosure belongs. The terminology used in the description of the present disclosure herein is for the purpose of describing particular embodiments only and is not intended to be limiting of the present disclosure. The practice of the embodiments described in this disclosure includes, unless otherwise indicated, utilize conventional techniques of biochemistry, chemistry, molecular biology, microbiology, cell biology, plant biology, genomics, biotechnology, and genetics, which are within the skill of the art. See, for example, Green and Sambrook, Molecular Cloning: A Laboratory Manual, 4th edition (2012); Current Protocols In Molecular Biology (F. M. Ausubel, et al. eds., (1987)); Plant Breeding Methodology (N. F. Jensen, Wiley-Interscience (1988)); the series Methods In Enzymology (Academic Press, Inc.): PCR 2: A Practical Approach (M. J. MacPherson, B. D. Hames and G. R. Taylor eds. (1995)); Harlow and Lane, eds. (1988) Antibodies, A Laboratory Manual; Animal Cell Culture (R. I. Freshney, ed. (1987)); Recombinant Protein Purification: Principles And Methods, 18-1142-75, GE Healthcare Life Sciences; C. N. Stewart, A. Touraev, V. Citovsky, T. Tzfira eds. (2011) Plant Transformation Technologies (Wiley-Blackwell); and R. H. Smith (2013) Plant Tissue Culture: Techniques and Experiments (Academic Press, Inc.).

All publications, patent applications, patents and other references cited herein are incorporated by reference in their entireties for the teachings relevant to the sentence and/or paragraph in which the reference is presented. As used herein, the term "allele" refers to one of several alternative forms of a sequence occupying a given locus on a chromosome. When all the alleles present at a given locus on a chromosome are the same, that plant is "homozygous" at that locus. If the alleles present at a given locus on a chromosome differ, that plant is "heterozygous" at that locus.

An "amplicon" is amplified nucleic acid, e.g., a nucleic acid that is produced by amplifying a template nucleic acid by any available amplification method (e.g., PCR, LCR, transcription, or the like).

The term "genome" encompasses not only chromosomal DNA found within the nucleus, but organelle DNA found within subcellular components (e.g., mitochondria, or plastid) of the cell.

A "genomic locus" as used herein refers to the genetic or physical location on a chromosome.

As used herein, the term "gene" includes a nucleic acid fragment that expresses a functional molecule such as, but not limited to, a specific protein coding sequence and regulatory elements, such as those preceding (5' non-coding sequences) and following (3' non-coding sequences) the coding sequence.

As used herein, the term "genome editing" or "editing" refers to any modification of a nucleotide sequence in a site-specific manner. In the present disclosure genome editing techniques include the use of endonucleases, recombinases, transposases, helicases and any combination thereof. In an aspect, a "modification" comprises the hydrolytic deamination of cytidine or deoxycytidine to uridine or deoxyuridine, respectively. In some embodiments, a sequence-specific editing system comprises an adenine deaminase. In an aspect, a "modification" comprises the hydrolytic deamination of adenine or adenosine. In an aspect, a "modification" comprises the hydrolytic deamination of adenosine or deoxyadenosine to inosine or deoxyinosine, respectively. In an aspect, a "modification" comprises the insertion of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In another aspect, a "modification" comprises the deletion of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In a further aspect, a "modification" comprises the inversion of at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In still another aspect, a "modification" comprises the substitution of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In still another aspect, a "modification" comprises the duplication of at least 1, at least 2, at least 3, at least 4, at least 5, at least 6, at least 7, at least 8, at least 9, at least 10, at least 15, at least 25, at least 50, at least 100, at least 200, at least 300, at least 400, at least 500, at least 750, at least 1000, at least 1500, at least 2000, at least 3000, at least 4000, at least 5000, or at least 10,000 nucleotides. In some embodiments, a "modification" comprises the substitution of an "A" for a "C", "G" or "T" in a nucleic acid sequence. In some embodiments, a "modification" comprises the substitution of an "C" for a "A", "G" or "T" in a nucleic acid sequence. In some embodiments, a "modification" comprises the substitution of an "G" for a "A", "C" or "T" in a nucleic acid sequence. In some embodiments, a "modification" comprises the substitution of an "T" for a "A", "C" or "G" in a nucleic acid sequence. In some embodiments, a "modification" comprises the substitution of an "C" for a "U" in a nucleic acid sequence. In some embodiments, a "modification" comprises the substitution of an "G" for a "A" in a nucleic acid sequence. In some embodiments, a "modification" comprises the substitution of an "A" for a "G" in a nucleic acid sequence. In some embodiments, a "modification" comprises the substitution of an "T" for a "C" in a nucleic acid sequence.

As used herein, the term "plant" refers to organisms commonly understood to be encompassed by the meaning of this term. In an embodiment, plants are living organisms that belong to the kingdom Plantae and include trees, shrubs, bushes, herbs, grasses, ferns, and moss. Typically, though not required, plants include stems, leaves, roots, flowers, fruit, seeds, bulbs, or any combination thereof. In an embodiment, plants include living organisms composed of eukaryotic cells comprising one or more of a cell wall, vacuole, and/or chloroplast or other photosynthetic pigment.

As used herein, the term "target site" or "target sequence" refers to a nucleotide sequence against which a genome editing technology binds and/or exerts cleavage, nickase, recombinase, deaminase, or transposase activity. A target site may be genic or non-genic. A target site may be on a chromosome, episome, a locus, or any other DNA molecule in the genome (including chromosomal, chloroplastic, mitochondrial DNA, plasmid DNA) of a cell. The target site can be an endogenous site in the genome of a cell, or alternatively, the target site can be heterologous to the cell and thereby not be naturally occurring in the genome of the cell, or the target site can be found in a heterologous genomic location compared to where it occurs in nature.

Several methods for editing are known in the art involving different sequence-specific genome modification enzymes (or complexes of proteins and/or guide RNA), that modify the genomic DNA. In some embodiments, a sequence-specific genome modification enzyme modifies the genome by inducing a double-strand break (DSB) or one or more single-stranded breaks (SSB) at a desired genomic site or locus, referred to herein as the target site. In some embodiments, sequence-specific genome modification enzymes, such as base editing enzymes, introduce modifications without cleaving the DNA. In some embodiments, during the process of repairing the DSB or SSB(s) introduced by the sequence-specific genome modification enzyme, a donor template DNA may become integrated into the genome at the site of the DSB or SSB(s). In some embodiments, during the process of repairing the DSB or SSB(s) introduced by the sequence-specific genome modification enzyme, an insertion or deletion mutation (indel) may be introduced into the genome. In other embodiments, the DSB or multiple SSBs may lead to an inversion of an excised sequence. In other embodiments, the DSB or multiple SSBs may lead to duplication of a nucleotide sequence. In some embodiments, during the process of repairing the DSB or SSB(s) introduced by the genome modification enzyme, substitutions of one or more nucleotides may be introduced into the genome. In some embodiments, a sequence-specific genome modification enzyme comprises a cytidine deaminase. In some embodiments, a sequence-specific genome modification enzyme comprises an adenine deaminase. In the present disclosure, sequence-specific genome modification enzymes include endonucleases, recombinases, transposases, deaminases, helicases, reverse transcriptases and any combination thereof.

Sequence-specific genome modification enzymes (or complexes of proteins and/or guide RNA) may be used to introduce one or more insertions, deletions, substitutions, base modifications, translocations, or inversions to a genome of a host cell. In some embodiments, a sequence-specific genome modification enzymes (or complexes of proteins and/or guide RNA) comprises a DNA binding domain, such as a CRISPR-Cas effector protein, a zinc finger protein, or a transcription activator (TAL) protein. In some embodiments, the sequence-specific DNA binding domain maybe a fusion protein. In some embodiments, a sequence-specific genome modification enzyme can include, but is not limited to, an RNA-guided nuclease editing system, such as a CRISPR associated nuclease (non-limiting examples of CRISPR associated nucleases include Cas1, Cas1B, Cas2, Cas3, Cas4, Cas5, Cas6, Cas7, Cas8, Cas9 (also known as Csn1 and Csx12), Cas10, Cas 12a (also known as Cpf1), Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4, CasX, CasY, Mad7) and CRISPR array (CRISPR guide) nucleic acid that when expressed or introduced as a system in a cell can modify a target nucleic acid in a sequence specific manner. Other examples of sequence-specific genome modification enzymes include a meganucleases, zinc finger nucleases (ZFNs), and transcription activator-like effector nucleases (TALENs). In some embodiments, a sequence-specific genome modification enzyme can comprise one or more sequence-specific nucleic acid binding domains (DNA binding domains) that can be from, for example, a polynucleotide-guided effector protein (e.g., a Cas9, a Cas12a), a zinc finger protein, and/or a transcription activator-like effector protein (TALE) and an effector domain that modifies the DNA. Examples of effector domains include cleavage domains (e.g., nucleases) including, but not limited to, an endonuclease (e.g., Fok1), a deaminase (e.g., a cytosine deaminase, an adenine deaminase), a reverse transcriptase, a Dna2 polypeptide, and/or a 5' flap endonuclease (FEN).

In some embodiments, the CRISPR associated nuclease is selected from a Type I CRISPR-Cas system, a Type II CRISPR-Cas system, a Type III CRISPR-Cas system, a Type IV CRISPR-Cas system, Type V CRISPR-Cas system, or a Type VI CRISPR-Cas system. CRISPR associated nucleases, require another non-coding nucleotide component, referred to as a guide nucleic acid, to have functional activity. Guide nucleic acid molecules provided herein can be DNA, RNA, or a combination of DNA and RNA. As used herein, a "guide RNA" or "gRNA" refers to an RNA that recognizes a target DNA sequence and directs, or "guides", a CRISPR effector protein to the target DNA sequence. A guide RNA is comprised of a region that is complementary to the target DNA (referred to as the crRNA) and a region that binds the CRISPR effector protein (referred to as the tracrRNA). A guide RNA may be a single RNA molecule (sgRNA) or two separate RNAs molecules (a 2-piece gRNA). In some embodiments a gRNA may further comprise an RNA template (pegRNA) for a reverse transcriptase. Examples of CRISPR-Cas effector proteins include, but are not limited to, Cas9, C2c1, C2c3, C2c4, C2c5, C2c8, C2c9, C2c10, Cas12a (also referred to as Cpf1), Cas12b, Cas12c, Cas12d, Cas12e, Cas12h, Cas12i, Cas12g, Cas13a, Cas13b, Cas13c, Cas13d, Cas1, Cas1B, Cas2, Cas3, Cas3', Cas3", Cas4, Cas5, Cas6, Cas7, Cas8, Cas9 (also known as Csn1 and Csx12), Cas10, Csy1, Csy2, Csy3, Cse1, Cse2, Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, Csf4 (dinG), Csf5, Cas14a, Cas14b, and Cas14c effector protein.

Sequence-specific modification enzymes can be used to introduce edits into the genome of a plant to produce new and beneficial genetic variation. Depending on the method of transformation and the timing of sequence-specific modification enzyme activity to introduce edits in the genome, the plants (R0) can be chimeric, with some cells having one or more edited alleles and some cells having no edited alleles (WT). As used herein the term "edited allele" refers to a target site comprising one or more modifications compared to the reference sequence at that locus. The abundance of an edited allele in an R0 plant is influenced by the timing of the modification (early in development vs late) and tissue in which an edit is made. For example, an edit made early in development will be found in more tissues of a plant that edits made late in development. The methods described herein may be used to evaluate whether any particular edited allele is likely to be heritable. R0 plants with heritable edited alleles as determined by the methodologies described herein can be selected for further propagation and analysis, while R0 plants with edited alleles which the methodologies described herein identify as unlikely to be heritable can be discarded, thus saving resources.

The methodologies provided herein can be used to select R0 plants carrying one or more edited alleles in its genome for propagation and additional breeding of its progeny using one or more known methods in the art, e.g., pedigree breeding, recurrent selection, mass selection, and mutation breeding. Edits selected via methods and systems provided herein can be introgressed into different genetic backgrounds and selected for via genotypic or phenotypic screening.

Pedigree breeding starts with the crossing of two genotypes, such as a first plant comprising an edited allele and another plant lacking the edited allele. If the two original parents do not provide all the desired characteristics, other sources can be included in the breeding population. In the pedigree method, superior plants are self-pollinated and selected in successive filial generations. In the succeeding filial generations, the heterozygous condition gives way to homogeneous varieties as a result of self-fertilization and selection. Further, edits that are not selected for, for example off-target edits are lost. Typically, in the pedigree method of breeding, five or more successive filial generations of self-pollination and selection is practiced: F1 to F2; F2 to F3; F3 to F4; F4 to F5, etc. After a sufficient amount of inbreeding, successive filial generations will serve to increase seed of the developed variety. The developed variety may comprise homozygous alleles at about 95% or more of its loci.

In addition to being used to create a backcross conversion, backcrossing can also be used in combination with pedigree breeding. Backcrossing can be used to transfer one or more edited alleles from the donor parent to a developed variety called the recurrent parent, which has overall good agronomic characteristics yet lacks that desirable trait or traits. However, the same procedure can be used to move the progeny toward the genotype of the recurrent parent but at the same time retain many components of the non-recurrent parent by stopping the backcrossing at an early stage and proceeding with self-pollination and selection. For example, a first plant variety may be crossed with a second plant variety to produce a first-generation progeny plant. The first-generation progeny plant may then be backcrossed to one of its parent varieties to create a BC1 or BC2. Progenies are self-pollinated and selected so that the newly developed variety has many of the attributes of the recurrent parent and yet several of the desired attributes of the non-recurrent parent. This approach leverages the value and strengths of the recurrent parent for use in new plant varieties.

Edits that are identified and/or characterized by the methods and systems provided herein can improve the agronomic characteristics of a plant. As used herein, the term "agronomic characteristics" refers to any agronomically important phenotype that can be measured. Non-limiting examples of agronomic characteristics include floral meristem size, floral meristem number, ear meristem size, shoot meristem size, root meristem size, tassel size, ear size, greenness, yield, growth rate, biomass, fresh weight at maturation, dry weight at maturation, number of mature seeds, fruit yield, seed yield, total plant nitrogen content, nitrogen use efficiency, resistance to lodging, plant height, root depth, root mass, seed oil content, seed protein content, seed free amino acid content, seed carbohydrate content, seed vitamin content, seed germination rate, seed germination speed, days until maturity, drought tolerance, salt tolerance, heat tolerance, cold tolerance, ultraviolet light tolerance, carbon dioxide tolerance, flood tolerance, nitrogen uptake, ear height, ear width, ear diameter, ear length, number of internodes, carbon assimilation rate, shade avoidance, shade tolerance, mass of pollen produced, number of pods, resistance to herbicide, resistance to insects and disease resistance.

Any plant or plant cell can be used with the methods and compositions provided herein.

In an aspect, a plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant. In an aspect, a plant is an angiosperm. In an aspect, a plant is a gymnosperm. In an aspect, a plant is a monocotyledonous plant. In an aspect, a plant is a dicotyledonous plant. In an aspect, a plant is a plant of a family selected from the group consisting of Alliaceae, Anacardiaceae, Apiaceae, Arecaceae, Asteraceae, Brassicaceae, Caesalpiniaceae, Cucurbitaceae, Ericaceae, Fabaceae, Juglandaceae, Malvaceae, Mimosaceae, Moraceae, Musaceae, Orchidaceae, Papilionaceae, Pinaceae, Poaceae, Rosaceae, Rutaceae, Rubiaceae, and Solanaceae.

In an aspect, a plant cell is selected from the group consisting of a corn cell, a rice cell, a sorghum cell, a wheat cell, an alfalfa cell, a barley cell, a millet cell, a rye cell, a sugarcane cell, a cotton cell, a soybean cell, a canola cell, a tomato cell, an onion cell, a pepper cell, a cucumber cell, an *Arabidopsis* cell, a millet cell, a bean cell, a blackberry cell, a broccoli cell, a cabbage cell, a carrot cell, a cauliflower cell, a fennel cell, a lettuce cell, a melon cell, a pea cell, a pumpkin cell, a raspberry cell, a spinach cell, a squash cell, a strawberry cell, a tobacco cell, a watermelon cell, a sweet corn cell, an eggplant cell, a gourd cell, an okra cell, a cassava cell, and a potato cell. In an aspect, a plant cell is an angiosperm plant cell. In an aspect, a plant cell is a gymnosperm plant cell. In an aspect, a plant cell is a monocotyledonous plant cell. In an aspect, a plant cell is a dicotyledonous plant cell. In an aspect, a plant cell is a plant cell of a family selected from the group consisting of Alliaceae, Anacardiaceae, Apiaceae, Arecaceae, Asteraceae, Brassicaceae, Caesalpiniaceae, Cucurbitaceae, Ericaceae, Fabaceae, Juglandaceae, Malvaceae, Mimosaceae, Moraceae, Musaceae, Orchidaceae, Papilionaceae, Pinaceae, Poaceae, Rosaceae, Rutaceae, Rubiaceae, and Solanaceae. The methodologies described herein for identifying R0 plants comprising heritable edited alleles described herein may be utilized with any now or future existing technology that allows for the comparison of the relative abundance (e.g., through comparison of the number reads, signal strength, etc.) of a particular edited allele compared to the other alleles present at a target site in a sample. In some embodiments, Sanger sequencing, Shotgun sequencing, Fragment Length Analysis (FLA), Single-molecule real-time sequencing (PacBio), Ion Torrent sequencing, Pyrosequencing, Sequencing by synthesis (Illumina), Combinatorial probe anchor synthesis, Sequencing by ligation (SOLiD sequencing), Nanopore Sequencing, or GenapSys Sequencing may be used.

In some embodiments, Fragment Length Analysis (FLA) can be used to predict the heritability of edited alleles. FLA is a PCR-based molecular assay that can be used to identify any indel (insertion or deletion) edits that impact amplicon size introduced at the target site by NHEJ-mediated (Non Homologous End joining) DNA, microhomology mediated end joining (MMEJ) or homologous recombination (HR) repair following cleavage by a genome editing tool, such as the sequence-specific genome modification enzymes (or complexes of proteins and/or guide RNA) described above. FLA compares variations in PCR fragment length to amplicons from a wild-type reference to identify samples having one or more indels relative to the wild-type reference. Genomic DNA from edited cells is subjected to a PCR reaction with primers flanking the target site to generate amplicons. The amplicons fragment length is then compared to a wild type amplicon to identify mutants. For FLA assay, PCR reactions may be carried out using 5' FAM-labeled primer, a standard primer and polymerase to generate PCR fragments. In some embodiments, a proofreading polymerase may be used. In some embodiments, the PCR product is run on DNA sequencer (eg: ABI sequencer, Thermofischer, MA). In some embodiments, two or more FLA reactions may be multiplexed and subsequently analyzed for fragment length variation to identify amplicons with indels at the two or more target sites.

In some embodiments, amplicon sequencing can be used to predict the heritability of edited alleles. In some embodiments, short amplicon sequencing by Illumina (SASi) can be used to predict the heritability of edited alleles. SASi is useful for identifying edits in amplicons of approximately 500 base pairs (bp) or less. With SASi, the start and end coordinates of the reads compared to the reference sequence are known. This methodology can detect a variety of edits, such as insertions, deletions, duplications, inversions, substitutions and any combinations thereof. In some embodiments, long amplicon sequencing by Illumina (LASi) can be used to predict the heritability of edited alleles. LASi is useful for identifying edits in amplicons that are larger than approximately 500 bp. Depending on factors, such as the quality of DNA extracted from the edited plants, the amplicons analyzed by LASi can be as long as approximately 10 Kb. LASi is similar to shotgun genomic sequencing, in that the read lengths, and the start and end coordinates of the individual reads compared to the reference sequence are random. See, e.g. FIG. 6. With LASi, a larger amplicon is generated and then sheered. The sheered pieces are sequenced, and the overall sequence is determined by piecing the sequences of the smaller sheered pieces together. LASi can be used to identify a variety of edits, such as insertions, deletions, inversions, translocations, duplications, substitutions, and any combinations thereof. In some embodiments, LASi can be useful for characterizing genome edits that span more than 500 bp of the genome, such as edits at multiple guide RNA target sites, larger insertions, deletions, translocations, etc.

For Illumina sequencing platforms, the sequencing reads from the ends of amplicons are of lower quality. If the target site is located within approximately 30 base pairs of either the 5' or 3' end of a read, sequencing errors can be reduced by utilizing overlapping (paired) reads. See, e.g. FIG. 5A. This paired read approach can be used for reducing errors in any sequencing methodology where sequence quality is low near the end of reads. Target sites whose DSBs or SSB(s) within ~30 nt of the end of the amplicon also run the risk of having the primer binding site deleted by the edit and not being detected.

In some embodiments, an R0 plant comprising an edited allele that meets or exceeds a selected reference cutoff is selected for further propagation and analysis. As used herein, the term "reference cutoff" refers to the percentage of reads representing a specific edited allele within a pool of reads from a target sequence. In some embodiments, the reference cutoff is selected from the group consisting of about: 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99%. In some embodiments where at least a 20% chance of inheritance of an edited allele is desired, an R0 plant comprising an edited allele that meets or exceeds a 10% reference cutoff is selected for further propagation. In some embodiments where at least a 50% chance of inheritance of an edited allele is desired, an R0 plant comprising an edited allele that meets or exceeds a 15% reference cutoff is selected for further propagation. In some embodiments where at least a 70% chance of inheritance of an edited allele is desired, an R0 plant comprising an edited allele that meets or exceeds a 20% reference cutoff is selected for further propagation. In some embodiments where at least a 90% chance of inheritance of an edited allele is desired, an R0 plant comprising an edited allele that meets or exceeds a 25% reference cutoff is selected for further propagation. In some embodiments where at least a 90% chance of inheritance of an edited allele is desired, an R0 plant comprising an edited allele that meets or exceeds a 30% reference cutoff is selected for further propagation. In some embodiments where at least a 90% chance of inheritance of an edited allele is desired, an R0 plant comprising an edited allele that meets or exceeds a 40% reference cutoff is selected for further propagation. In some embodiments where at least a 95% chance of inheritance of an edited allele is desired, an R0 plant comprising an edited allele that meets or exceeds a 50% reference cutoff is selected for further propagation.

In some embodiments, an edited allele is determined to have a high likelihood of heritability when the quantity of the sequence reads attributable to the edited allele is at or above a reference cutoff. In some embodiments, an edited allele is determined to have a low likelihood of heritability when the quantity of the sequence reads attributable to the edited allele is below a reference cutoff of 10%. In some embodiments, an R0 plant comprising an edited allele where the quantity of the sequence reads attributable to the edited allele is below a reference cutoff of 10% is not selected for further propagation. In some embodiments, the average reference cutoff for edited alleles at a target locus can be used to determine the number of R0 plants selected for further propagation and analysis. In some embodiments where the average reference cutoff for edited alleles at a target locus is low, a greater number of R0 plants are selected for further propagation and analysis. In some embodiments where the average reference cutoff for edited alleles at a target locus is high, fewer R0 plants are selected for further propagation and analysis. In some embodiments where the edited alleles at a desired target site fall below a desired reference cutoff, a greater number of R0 plants are selected for further propagation. In a further embodiment, the cells are obtained from one or two parts of the plant. In another embodiment, the plant part is selected from the group consisting of leaf, stem, root, flower, fruit, and combinations thereof. In a particular embodiment, the plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant.

In some embodiments, fragment length analysis (FLA) can be used to predict the heritability of edited alleles. In determining the heritability of an edited allele, the noise cutoff for an FLA assay is set at twice the height where greater than 50% of plants assayed have at least one presumptive noise peak. The heritability of edited alleles corresponding to a peak below four times the noise cutoff is variable. In some embodiments where the peaks corresponding to an edited allele is below four times the noise cutoff, a greater number of R0 plants are selected for further propagation and analysis. In some embodiments, R0 plants comprising edited alleles corresponding to peaks below four times the noise cutoff are not selected for further propagation and analysis. In some embodiments, R0 plants comprising edited alleles corresponding to peaks that are at least four times the noise cutoff are selected for further propagation and analysis.

In some embodiments, edited alleles corresponding to peaks that are less than or equal to the fold cutoff and greater than the noise cutoff are determined to have a high likelihood of heritability. Fold cutoff is calculated as 1.25 times n, where n is the number of alleles at a target site. In some embodiments, an R0 plant comprising an edited allele corresponding to a peak less than or equal to the fold cutoff and greater than the noise cutoff is selected for further propagation. In a still further embodiment, an edited allele is determined to have a low likelihood of heritability when the quantity of the sequence reads attributable to the edited allele is above a noise cutoff but below the reference cutoff, based on the quantity of the insertions and/or deletions in the amplified target sequence.

Figure 2:
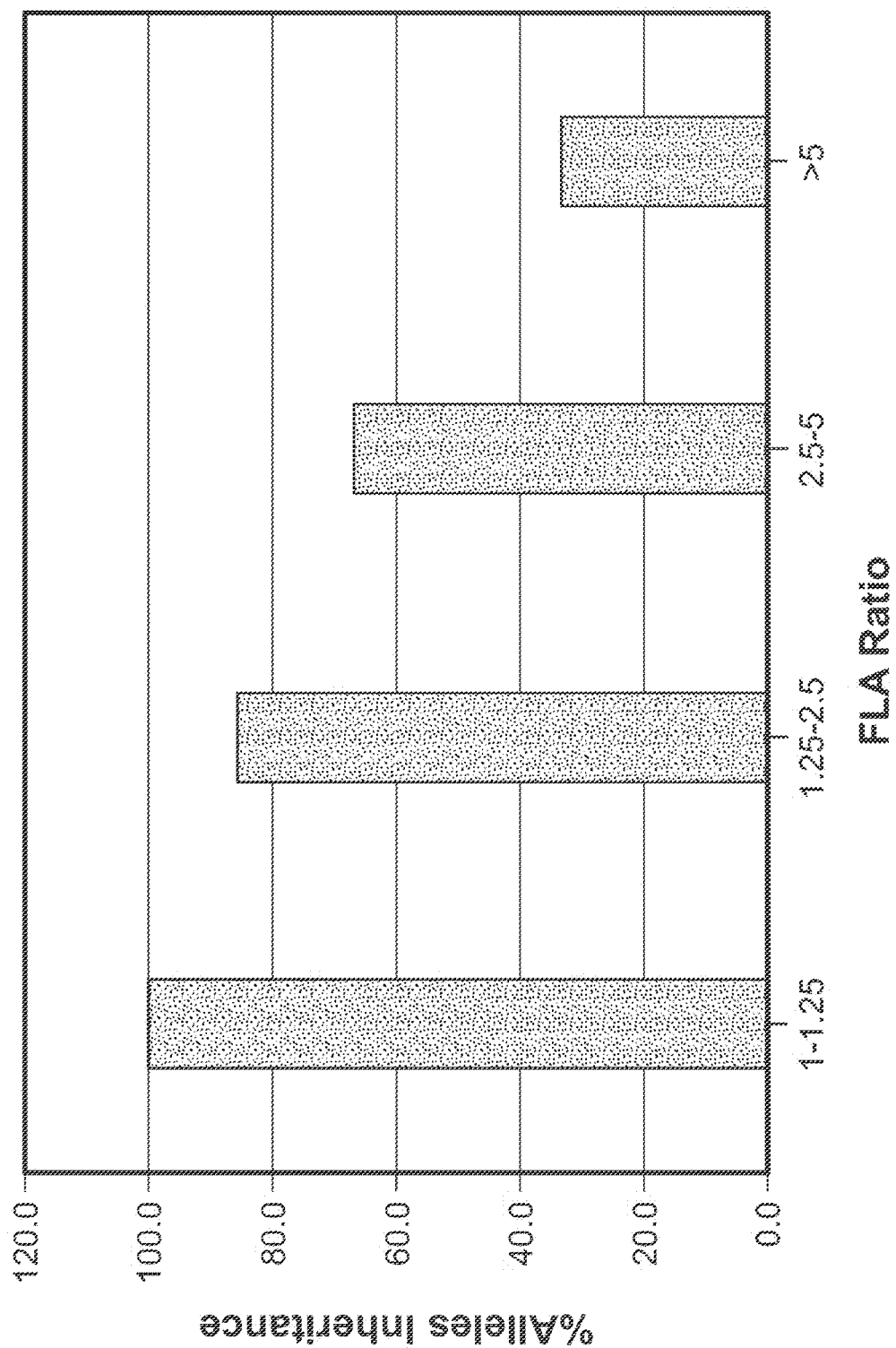
FIG. 2 is a graphical representation of correlation between FLA Peak Ratio and observed heritability of edited alleles.

As shown in FIG. 2, heritability tracks with the FLA peak ratio in plants with high confidence edit peaks. High confidence peaks are greater than or equal to the noise cutoff. The FLA peak ratio is calculated as the ratio between the height of the highest peak and the height of the peak under consideration. If the FLA peak ratio was less than or equal to 1.25, 100% of the edited alleles corresponding to such peak were observed in the next generation. 86% of the edited alleles corresponding to a peak with a FLA peak ratio less than or equal to 2.5 and greater than 1.25 were observed in the next generation. In some embodiments, an R0 plant comprising an edited allele corresponding to a peak with a FLA peak ratio less than or equal to 1.25 is selected for further propagation. In some embodiments, an R0 plant comprising an edited allele corresponding to a peak with a FLA peak ratio less than or equal to 2.5 is selected for further propagation. In some embodiments, an R0 plant comprising an edited allele corresponding to a peak with a FLA peak ratio less than or equal to 5 is selected for further propagation. In some embodiments, an R0 plant comprising an edited allele corresponding to a peak with a FLA peak ratio greater than 5 is not selected for further propagation. In some embodiments, the average FLA peak ratio for edited alleles at a target locus can be used to determine the number of R0 plants selected for further propagation and analysis. In some embodiments where the average FLA peak ratio for edited alleles at a target locus is equal to or greater than 5, a greater number of R0 plants are selected for further propagation and analysis. In some embodiments where the average FLA peak ratio for edited alleles at a target locus is less than 2.5, fewer R0 plants are selected for further propagation and analysis. In some embodiments where the edited alleles at a desired target site fall below a desired reference cutoff, a greater number of R0 plants are selected for further propagation.

In some embodiments, a method is provided for identifying heritable sequences in plants. The method comprises obtaining cells from a plant; extracting and isolating DNA from said plant cells; amplifying target sequence from the DNA; identifying and quantifying edited alleles within the amplified target sequence; and predicting the heritability of an edited allele based on the quantity of reads attributable to the edited allele in the amplified target sequence. In some embodiments, the method identifies and quantifies insertions and/or deletions. In an alternate embodiment, the method identifies and quantifies translocations and/or duplications. In another alternative embodiment, the method identifies and quantifies two or more of insertions, deletions, translocations, and duplications. In a further embodiment, the cells for analysis are obtained from one or more parts of an R0 plant. In some embodiments, the plant part is selected from the group consisting of leaf, stem, root, flower, fruit, and combinations thereof. In a particular embodiment, the plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant.

In some embodiments, the identification and quantification edited alleles is conducted by fragment length analysis or amplicon sequencing. In some embodiments, the cutoff for selecting an R0 plant is four times above the noise cutoff.

In some embodiments, a method is provided for selection of a plant with heritable edits. The method comprises: obtaining cells from a plant that has been contacted with a sequence-specific genome modification enzymes (or complexes of proteins and/or guide RNA); extracting and isolating DNA from said plant; amplifying a target sequence from the DNA; determining the frequency of a particular edit at the target sequence; and selecting a plant based on the frequency of the particular edit at the target sequence. In a further embodiment, the cells are obtained from one or two parts of the plant. In another embodiment, the plant part is selected from the group consisting of leaf, stem, root, flower, fruit, and combinations thereof. In a particular embodiment, the plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant.

In some embodiments, the frequency of a particular edit at the target sequence is at least about: 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, and 99%. In a further embodiment, the method further comprises propagating the plant. In a still further embodiment, the method further comprises crossing the plant, such as with another plant. In a particular embodiment, the plant is selected from the group consisting of a corn plant, a rice plant, a sorghum plant, a wheat plant, an alfalfa plant, a barley plant, a millet plant, a rye plant, a sugarcane plant, a cotton plant, a soybean plant, a canola plant, a tomato plant, an onion plant, a pepper plant, a cucumber plant, an *Arabidopsis* plant, a millet plant, a bean plant, a blackberry plant, a broccoli plant, a cabbage plant, a carrot plant, a cauliflower plant, a fennel plant, a lettuce plant, a melon plant, a pea plant, a pumpkin plant, a raspberry plant, a spinach plant, a squash plant, a strawberry plant, a tobacco plant, a watermelon plant, a sweet corn plant, an eggplant plant, a gourd plant, an okra plant, a cassava plant, and a potato plant.

In some embodiments, the cells from the R0 plant are obtained by, for example, a hole punch of a plant part, including, but not limited to, a punch from a leaf, stem, root, flower, and/or fruit. Alternatively, the relevant plant part can be excised from the plant by cutting, trimming, or otherwise removing a section of the plant. The cells of the excised plant tissue may then be harvested by isolating the cells from acellular plant material, such as the extracellular matrix (ECM). Cells and tissue obtained from an R0 can be prepared for analysis using techniques well known in the art. Once the desired cells and or tissue from the plant are obtained, DNA is extracted and isolated from the cells. In general in some embodiments, the cell membranes are lysed with detergents and/or surfactants. Undesired proteins can be removed with proteases. RNA can be removed by RNases. The remaining DNA can be isolated, cleaned and used in molecular biology techniques. DNA may be harvested according to conventional techniques known in the art, including ethanol precipitation, phenol-chloroform extraction, and minicolumn purification. The extracted and isolated DNA may then be amplified in whole or in part. In a particular embodiment, the partially amplified DNA include target sequences of DNA. The target sequences may include one or more genes, one or more parts of a gene (including exons, introns, and parts and/or combinations thereof), one or more transcriptional elements, and/or one or more sequences not included within a gene. DNA amplification can be accomplished by conventional techniques known in the art. Such techniques include, but are not limited to, polymerase chain reaction (PCR), ligase chain reaction, and transcription-mediated amplification.

In a further embodiment, the harvested cells may be cultured in vitro to expand or otherwise process the cells. The cultured cells may be a mixed cell population, such as those harvested from plants, only having the ECM removed. Alternatively, the cultured cells may be further separated and isolated. The cultured cells may be incubated in conventional media according to know culturing techniques. Typically, the cell culture media comprises one or more of amino acids, sugars, vitamins, salts, anti-microbial agents, and growth factors. In some embodiments, the cells may be induced to form callus. In some embodiments, plants may be produced from the callus, which can be selected for further propagation and analysis.

Prediction of the heritability of the sequence is discussed above and exemplified in the Example below.

The present disclosure will now be described with reference to the following examples. It should be appreciated that these examples are not intended to limit the scope of the claims to the present disclosure; but are rather intended to be examples of certain embodiments. Any variations in the exemplified methods that occur to the skilled artisan are intended to fall within the scope of the present disclosure.

EXAMPLES

Example 1

This example relates to FLA. Genomic DNA is extracted from plants transformed with CRISPR-Cas12a and gRNA expression constructs designed to target a preselected genomic target site. Extracted DNA is subjected to a PCR reaction with primers flanking the target site to generate amplicons. The fragment length of the amplicons derived from cells in which the genome editing tool was introduced is then compared to a wild type (wt) reference amplicon to identify insertion or deletion edits. PCR reactions are carried out using 5' FAM-labeled primer, a standard primer and PHUSION® DNA polymerase (New England Biolabs, MA) according to manufacturer's instructions to generate PCR fragments. 1 μL PCR product is combined with 0.5 μL GeneScan 1200 LIZ Size Standard (Thermo Fisher, MA), 8.5 μL formamide, and run on an ABI sequencer (Thermo Fisher, MA).

Figure 1:
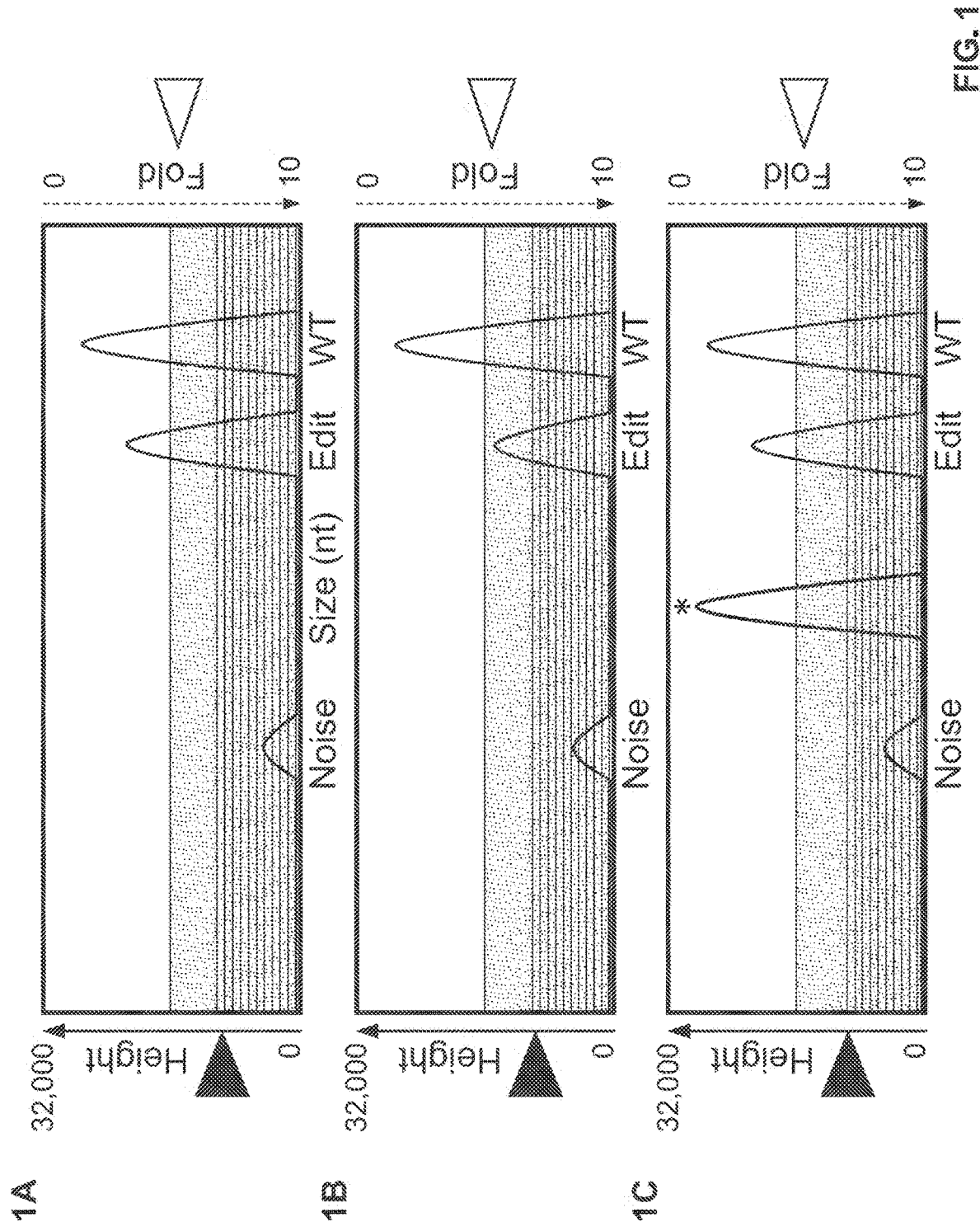

The data is analyzed as follows. First, the noise cutoff of each assay is calculated. For each sample in an assay, peaks are ranked from highest to lowest height. Assuming 1 peak per allele, the two peaks (in the case of diploids) with the greatest heights are assumed to be from those alleles and any other peaks are presumptively noise. For example, for a single locus in a diploid plant, the third highest peak is noise (1 per allele+1 noise). For two loci in a diploid plant, the fifth highest peak is noise. Similarly, for a tetraploid plant, the fifth highest peak is noise (4 alleles+noise). Noise cutoff is set at twice the height where greater than 50% of plants assayed have one presumptive noise peak. Peaks that are below four times the noise cutoff are considered low confidence peaks, in that the heritability of the sequence represented by the peak is more variable. These low confidence peaks are often associated with poor DNA or assay quality. Minimum allowed height of a peak is 200. Minimum size allowed is 100 nucleotides. Any peak other than the peak of the expected wt size that is present in 80% or more of the plants assayed is considered to be unedited, as it is a likely homolog or common PCR artifact. Such peaks are removed prior to both maximum height and noise cutoff calculations. (see, "*" peak in FIG. 1 (1C)). However, where the edit is expected to be a more uniform size due to use of a template to guide the edit or a strong preference in DNA repair due to microhomology, additional unedited reference plants can be run to determine if such peak is unique to the edited plants and absent from the reference plants.

Fold cutoff is calculated as 1.25 times n, where n is the number of alleles amplified. For multiple loci, the fold cutoff can be calculated by 1.25 per possible allele. For example, the fold cutoff for a single locus with two alleles will be 2.5. The fold cutoff for two loci with two alleles each is five.

Similarly, for a tetraploid plant the fold cutoff is 5. In this way, the fold cutoff can be scaled for multiple loci or any polyploid species.

The FLA peak ratio is calculated by determining the ratio between the height of the maximum (highest) peak and the height of the peak under consideration. An edit corresponding to a peak with a FLA peak ratio less than or equal to the fold cutoff and greater than the noise cutoff is predicted to have a high likelihood of heritability (see, e.g., FIG. 1 (1A)). An edit corresponding to a peak with a FLA peak ratio greater than the fold cutoff but greater than the noise cutoff, is predicted to have a lower likelihood of heritability (see, e.g., FIG. 1 (1B)).

For plants that had high confidence edit peaks and the assay spanned only 1 locus in the gene, heritability tracked with the FLA peak ratio (see, FIG. 2). If the FLA peak ratio was less than or equal to 1.25, 100% of the edited alleles were observed in the next generation. 86% of the edits with a FLA peak ratio less than or equal to 2.5 and greater than 1.25 were also observed in the next generation. Due to the high rate of heritability, edits with a FLA peak ratio less than or equal to the fold cutoff and greater than the noise cutoff are identified as edits having a high likelihood of heritability (see, FIG. 1 (1A)) and are selected for propagation. Plants with edits having FLA peak ratios greater than the fold cutoff, but greater than the noise cutoff, were not selected for further propagation because the edits are predicted to have a low likelihood of heritability (see, FIG. 1 (1B)).

Example 2

In this example, the data obtained by FLA analysis is converted to the percentage sequence analog using the following equation:

$$\frac{\text{peak height}}{\text{sum of all non-noise peak heights}} \times 100 = \text{Percentage sequence analog}$$

Figure 3:
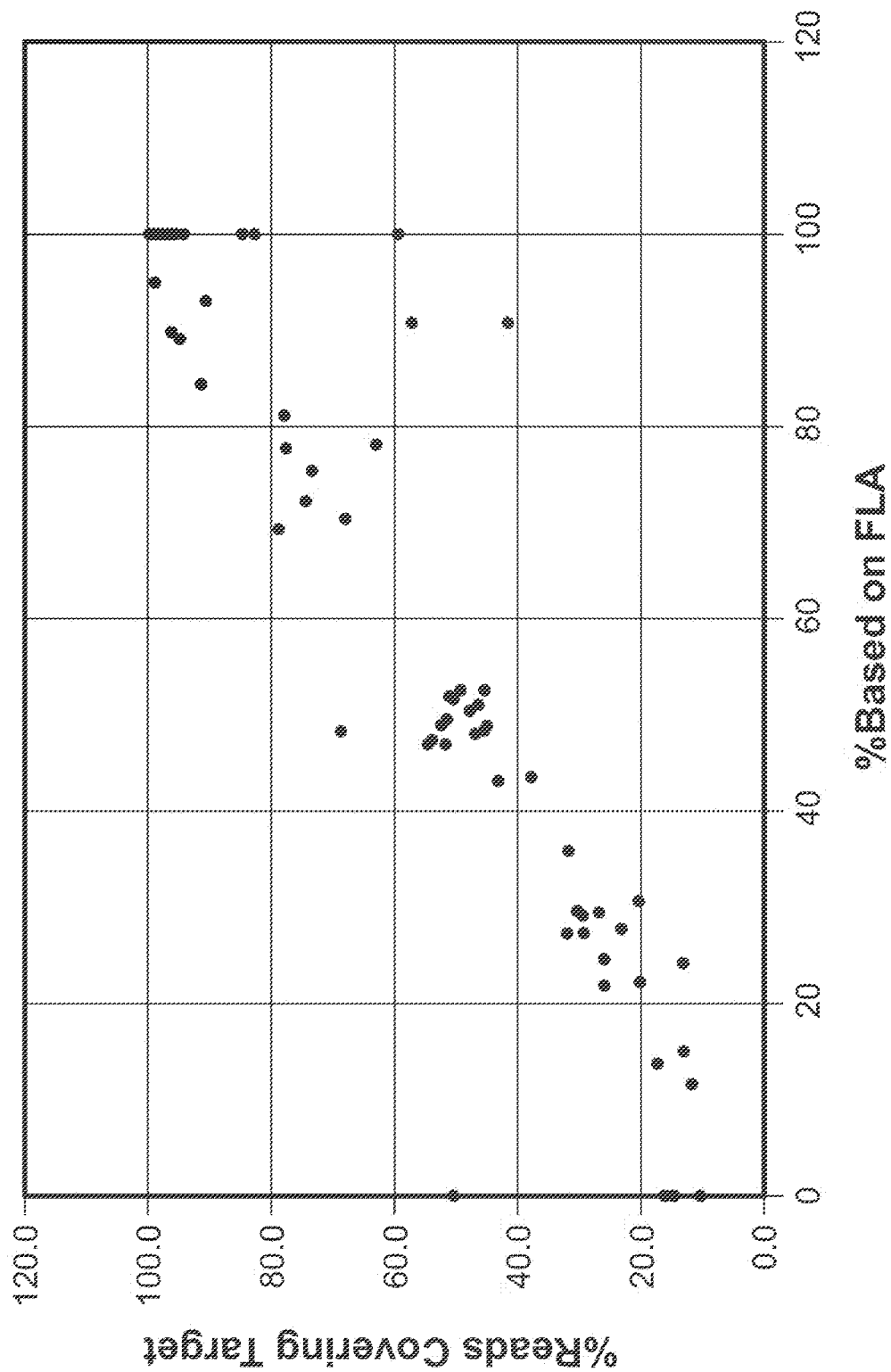
FIG. 3 is a graphical representation of concordance of edited allele abundance as determined by FLA and amplicon sequencing reads.

A 2.5 FLA peak ratio correlates to about 28% sequencing reads, assuming there are only two peaks for that plant. A high level of concordance between FLA peak ratio and percentage sequencing reads for a subset of plants, indicating that the heritable edit concept is applicable to amplicon sequencing. See, FIG. 3.

Figure 4:
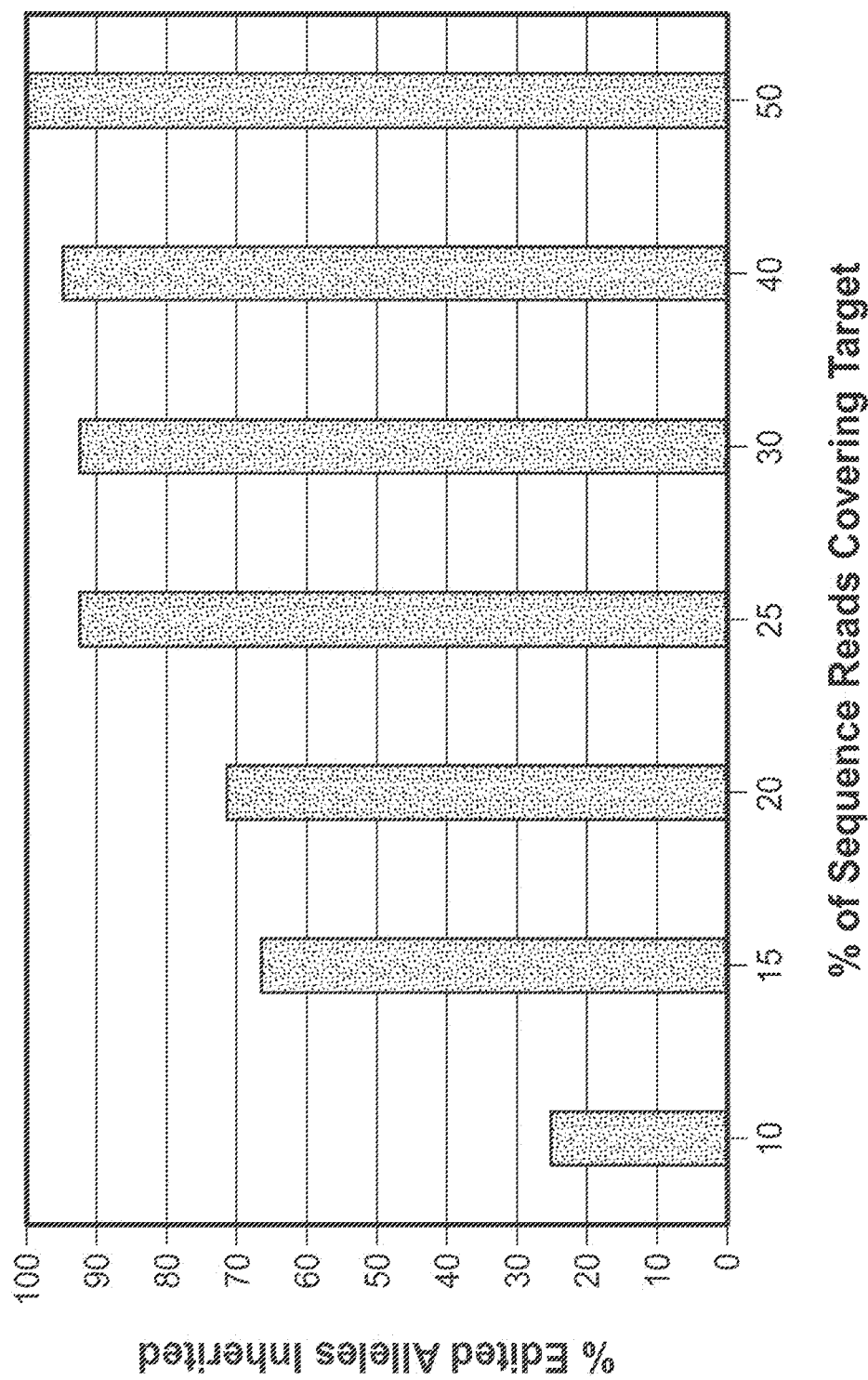
FIG. 4 is a graphical representation showing heritability of edited alleles as a function of percentage of amplicon sequence reads for the edited alleles.

Similarly, alleles with greater than or equal to 25% sequence analogs (e.g., a FLA peak ratio of less than or equal to 2.5) have a high likelihood of heritability. These alleles are inherited at greater than 90%. See, FIG. 4. In contrast, plants with edited alleles with sequence reads between 10 and 15% of all sequence reads (e.g., a FLA peak ratio of greater than 5, etc.) are inherited at a rate of 25%.

Example 3

Various methods can be used for quantifying edited alleles. For amplicon sequencing, two methods are described: SASi and LASi. For SASi, PCR amplicons of approximately 150 base pairs are generated. As sequencing reads from the ends of the amplicons tends to be lower in quality, it is preferred that the gRNA target site is approximately at least 30 base pairs from either end of a read (see, FIG. 5 (5B)). Where the target site is located near (approximately 30 base pairs or less) the end of a read, overlapping reads (paired SASi) can be used to reduce sequencing errors (see, FIG. 5 (5A)). For LASi, a longer amplicon is generated and sheered (FIG. 6) and the sheered fragments are sequenced through standard sequencing techniques. Target sites whose DSBs or SSB(s) within about (~) 30 nt of the end of the amplicon also run the risk of having the primer binding site deleted by the edit and not being detected.

SASi/LASi data analysis includes adaptor trimming and quality filtering, alignment of reads to references, editing calls and zygosity calls. FIG. 7 shows a workflow 700 of the analysis process, and sample edit call output is shown in FIG. 8. In FIG. 8, "S2d9" describes an edit wherein the deletion starts from the second base of the gRNA target sequence and the deletion is nine nucleotides long. Similarly, "S-1d11" describes an edit wherein the deletion starts one base upstream of the gRNA target site and the deletion is eleven nucleotides long.

Zygosity can be determined from SASi or LASi data. For example, a 10% cutoff may be applied and only observed alleles with read frequencies greater than or equal to the cutoff are considered. Table 1 lists criteria for zygosity determination (or calls) using SASi and LASi data. FIG. 9 provides the zygosity determinations for the plants described in Example 8. For example, "chimeric, wt/−9/−8" indicates a chimeric zygosity with wild type (wt), a 9 bp deletion (−9), and an 8 bp deletion (−8). "biallelic" indicates presence of two alleles.

TABLE 1

| Criteria | Zygosity Call |
| --- | --- |
| only wt meets cutoff | wt |
| only one edit type meets cutoff | edit, homozygous |
| both wt and an edit type meet cutoff | wt/edit, heterozygous |
| two edit types meet cutoff | edit/edit, bi-allelic |
| >2 types (edits and /or wt) meet cutoff | chimeric |

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Unless the context indicates otherwise, it is specifically intended that the various features described herein can be used in any combination. Moreover, the present disclosure also contemplates that in some embodiments, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

The terminology used herein is for the purpose of describing particular example embodiments only and is not intended to be limiting. As used in the description and the appended claims, the singular forms "a," "an" and "the" are intended to include the plural forms as well, unless the context clearly indicates otherwise. Also as used herein, "and/or" refers to and encompasses any and all possible combinations of one or more of the associated listed items, as well as the lack of combinations when interpreted in the alternative ("or").

The term "about," as used herein when referring to a measurable value such as an amount or concentration and the like, is meant to encompass variations of ±10%, ±5%, ±1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X. A range provided herein for a measureable value may include any other range and/or individual value therein. As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y." Further, the disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof. As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising." The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, seeds, members and/or sections, these elements, components, seeds, members and/or sections should not be limited by these terms. These terms may be only used to distinguish one element, component, seed, member or section from another element, component, seed, member or section. Terms such as "first," "second," and other numerical terms when used herein do not imply a sequence or order unless clearly indicated by the context. Thus, a first element, component, seed, member or section discussed below could be termed a second element, component, seed, member or section without departing from the teachings of the example embodiments.

What is claimed is:

1. A method for selection of R0 plants with heritable edited alleles, the method comprising:
    obtaining cells from each R0 plant;
    extracting and isolating DNA from said each R0 plant;
    generating amplicons comprising a target site from the DNA;
    determining a noise cutoff for a fragment length analysis (FLA) assay of the R0 plant amplicons;
    selecting for R0 plants comprising edited alleles corresponding to peaks that are at least four times the noise cutoff; and
    propagating the selected R0 plants.

2. The method of claim 1, wherein the cells are obtained from two or more parts of the R0 plants.

3. The method of claim 1, further comprising:
    determining a fold cutoff for the FLA assay of the R0 plant amplicons; and
    selecting for R0 plants comprising edited alleles corresponding to peaks that are less than or equal to the fold cutoff.

4. The method of claim 3, wherein the target site comprises 2 alleles or 4 alleles.

* * * * *